United States Patent
Pothireddy et al.

(10) Patent No.: US 8,132,036 B2
(45) Date of Patent: *Mar. 6, 2012

(54) REDUCING LATENCY IN DATA TRANSFER BETWEEN ASYNCHRONOUS CLOCK DOMAINS

(75) Inventors: Anil Pothireddy, Hyderabad (IN);
Kirtish Karlekar, Bangalore (IN);
David Grant Wheeler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 584 days.

This patent is subject to a terminal disclaimer.

(21) Appl. No.: 12/109,483

(22) Filed: Apr. 25, 2008

(65) Prior Publication Data
US 2009/0271651 A1 Oct. 29, 2009

(51) Int. Cl.
G06F 1/12 (2006.01)
H04L 7/00 (2006.01)
G06F 13/20 (2006.01)

(52) U.S. Cl. ........ 713/400; 713/401; 713/500; 713/600; 710/313; 710/315; 375/354

(58) Field of Classification Search .................. 713/400, 713/401; 710/313, 315
See application file for complete search history.

(56) References Cited

U.S. PATENT DOCUMENTS

| | | | |
|---|---|---|---|
| 5,202,936 A | 4/1993 | Kobiyama | |
| 5,237,668 A | 8/1993 | Blandy et al. | |
| 5,535,377 A * | 7/1996 | Parks | 713/400 |
| 5,548,620 A * | 8/1996 | Rogers | 375/354 |
| 5,602,878 A | 2/1997 | Cross | |
| 5,644,604 A | 7/1997 | Larson | |
| 5,793,227 A | 8/1998 | Goldrian | |
| 6,112,307 A * | 8/2000 | Ajanovic et al. | 713/400 |
| 6,414,903 B1 | 7/2002 | Keeth et al. | |
| 6,425,088 B1 * | 7/2002 | Yasukawa et al. | 713/400 |
| 6,499,280 B1 * | 12/2002 | Tsutsui | 53/570 |
| 6,535,946 B1 | 3/2003 | Bryant et al. | |
| 6,603,336 B1 | 8/2003 | Kessler et al. | |
| 6,629,254 B1 | 9/2003 | Naqvi et al. | |
| 6,633,991 B1 | 10/2003 | Goldrian | |
| 6,735,712 B1 * | 5/2004 | Maiyuran et al. | 713/501 |

(Continued)

OTHER PUBLICATIONS

Cadence—"Clock Domain Crossing: Closing the Loop on Clock Domain Functional Implementation Problems", Dated 2004, 15 pages.*

(Continued)

*Primary Examiner* — Brian T Misiura
(74) *Attorney, Agent, or Firm* — Scully, Scott, Murphy & Presser, P.C.; Owen J. Gamon

(57) ABSTRACT

A method and an interfacing circuit are disclosed for transmitting data between a first clock domain operating at a first clock frequency C1 and a second clock domain operating at a second clock frequency C2. In accordance with this invention, data are transmitted from the first domain, through the interfacing circuitry, and to the second domain. Also, the interfacing circuitry includes a synchronization section that operates at a third frequency C3, which, in one embodiment, is greater than and a whole number multiple of C2. Preferably, C3 is an even whole number multiple of C2. In the preferred embodiment, a clock signal A is used to operate the second clock domain at frequency C2, and a clock signal B is used to operate the synchronization section of the interfacing circuitry at frequency C3, and clock signals A and B are source synchronized.

11 Claims, 4 Drawing Sheets

U.S. PATENT DOCUMENTS

| | | | |
|---|---|---|---|
| 6,799,280 B1 | 9/2004 | Edenfield et al. | |
| 6,850,092 B2 | 2/2005 | Chelcea et al. | |
| 6,867,630 B1 | 3/2005 | Talledo et al. | |
| 6,900,665 B2 | 5/2005 | Ma | |
| 6,904,553 B1 * | 6/2005 | Brown | 714/731 |
| 6,906,555 B2 | 6/2005 | Ma | |
| 6,910,145 B2 | 6/2005 | MacLellan et al. | |
| 6,949,955 B2 | 9/2005 | Glasser | |
| 6,954,869 B2 | 10/2005 | Syed | |
| 7,010,713 B2 | 3/2006 | Roth et al. | |
| 7,027,542 B1 * | 4/2006 | Shihadeh | 375/354 |
| 7,036,038 B2 * | 4/2006 | Urzi et al. | 713/401 |
| 7,096,375 B2 * | 8/2006 | Wakayama et al. | 713/400 |
| 7,107,393 B1 | 9/2006 | Sabih | |
| 7,123,674 B2 * | 10/2006 | Mackey et al. | 375/354 |
| 7,149,916 B1 * | 12/2006 | Marino | 713/600 |
| 7,191,354 B2 | 3/2007 | Purho | |
| 7,289,946 B1 * | 10/2007 | Lee | 703/16 |
| 7,296,174 B2 | 11/2007 | Kelly | |
| 7,363,526 B1 | 4/2008 | Chong et al. | |
| 7,382,824 B1 * | 6/2008 | Marmash et al. | 375/224 |
| 7,500,132 B1 * | 3/2009 | Pothireddy et al. | 713/600 |
| 7,583,106 B2 * | 9/2009 | Cumming et al. | 326/93 |
| 2002/0087909 A1 | 7/2002 | Hummel et al. | |
| 2006/0106863 A1 | 5/2006 | Ramasamy Venkatraj et al. | |
| 2006/0274870 A1 | 12/2006 | Wielage | |
| 2006/0277329 A1 | 12/2006 | Paulson et al. | |
| 2006/0282251 A1 | 12/2006 | Schuppe | |
| 2007/0064852 A1 | 3/2007 | Jones et al. | |
| 2007/0073877 A1 | 3/2007 | Boykin et al. | |
| 2007/0139085 A1 | 6/2007 | Elliot et al. | |
| 2007/0208980 A1 | 9/2007 | Gregorius et al. | |
| 2008/0150605 A1 | 6/2008 | Chueh et al. | |

OTHER PUBLICATIONS

Suk-Jin Kim et al. "A parallel flop synchronizer and the handshake interface for bridging asynchronous domains", IEICE transactions on fundamentals of electronics, communications and computer science, 2004, vol. 87, No. 12, pp. 3166-3173.

Cangsang Zhao et al. "An 18 MB, 12.3 GB/s CMOS pipeline-burst cache SRAM with 1.54 Gb/s/pin", 1999 IEEE International Solid-State Circuits Conference, San Francisco, California, Feb. 16, 1999, pp. 200-201.

Suk-Jin Kim et al. "Low latency four-flop synchronizer with the handshake interface", IEICE transactions on information and systems, E88D, Jul. 2005, pp. 1460-1463.

Finchelstein, Daniel Frederic, "Low-Power Digital Processor for Wireless Sensor Networks", Massachusetts Institute of Technology, Thesis, Department of Electrical Engineering and Computer Science, May 9, 2005, pp. 1-72 (view online only at http://hdle.handle.net/1721.1/34109)—only abstract uploaded here.

Kessels, Joep, "Register-Communication between Mutually Asynchronous Domains", Proceedings of the 11th IEEE International Symposium on Asynchronous Circuits and Systems, ASYNC'05.

Kinniment, David J. et al., "Low Latency Synchronization Through Speculation", Research Paper, School of Electrical and Electronic and Computer Engineering, University of Newcastle, United Kingdom www.staff.ncl.ac.uk/david.kinniment/Research/papers/speculatio.pdf.

Chakraborty, Ajanta et al., "Efficient Self-Timed Interfaces for Crossing Clock Domains", Department of Computer Science, University of British Columbia, Canada, pp. 1-11 www.cs.utah.edu/classes/cs6943/papers/async2003.pdf.

Frank, Uri et al., "A Predictive Synchronizer for Periodic Clock Domains", VLSI Systems Research Center, Technion—Israel Institute of Technology, Haifa 32000, Israel, LNCS 2004, pp. 402-412 www.springerlink.com/index/6DQC6VH4G5Q33JDC.pdf.

Rennert, Jens et al., "Clock Domain Modeling is Essential in High Density SoC Design", Jun. 6, 2003 www.fulcrummicro.com/tech_resources/eetimes_03-0606_03.pdf.

Sjalander, Magnus, "Case Study of a Double Data Rate Memory Controller for System-on-Chip", Computer Science and Engineering Program, Master Thesis, Department of Computer Science and Electrical Engineering, Division of Embedded Internet Systems, Dec. 15, 2002, pp. 1-63. maze.olf.sgsnet.se:8080/thesis/txt/FinalReport.doc.

Sjalander, Magnus, "Design and Implementation of a DDR SDRAM Controller for System-on-Chip", Computer Science and Engineering Program, Master Thesis, Department of Computer Science and Electrical Engineering, Division of Embedded Internet Systems, Dec. 15, 2002, pp. 1-76 maze.olf.sgsnet.se:8080/thesis/tx/ericsson_report.doc.

Smirnov, Alexander et al., "Synthesizing Asynchronous Micropipelines with Design Compiler", ECE, Boston University, 2006, pp. 1-35 (view online only at http://async.bu.edu/publications/snug06.pdf)—only abstract uploaded here.

* cited by examiner

000
REDUCING LATENCY IN DATA TRANSFER BETWEEN ASYNCHRONOUS CLOCK DOMAINS

BACKGROUND ART

Asynchronous data transfers have become very common in many integrated circuit devices, such as ASICs and SoCs, today. In particular, various components or subsystems utilized for the construction of an integrated circuit may independently operate at different frequencies, such as in microprocessors and micro-controllers, where certain components or subsystems have a faster rate of operation than the operating frequencies of other system components or subsystems. Therefore, typically, it is desirable to devise integrated circuits with the ability to support multiple domains, which may operate at different frequencies.

For instance, many integrated circuits include a number of electronic circuits referred to as "clocked logic domains" that operate independently based on electrical "timing" or "clock" signals. Such clock signals are used to control and coordinate the activities of various components or subsystems.

Since there will not be a fixed relationship between the active edge of the launch clock and the capture clock, there is a possibility of having setup or hold violations in the capture flip-flop, causing meta-stability. To avoid meta-stability in asynchronous data transfer, a commonly adopted technique is to double latch (also called double stage synchronization, or double flopping) the clock domain crossing signal at the receive domain clock frequency. Double flopping involves passing an asynchronous signal(s) through a pair of edge triggered D-Flip-flops or some equivalent storage element. If the receiving clock frequency is considerably less than the transmitting clock frequency, there is a huge latency involved in the double flopping process, often up to 20 or more clock cycles in the higher frequency domain. This situation frequently arises with slower devices, like a Flash Memory controller, being used in ASICs that have a majority of the components running at a much higher clock frequency.

Any reduction in the clock domain-crossing overhead tremendously reduces the data transfer latencies and increases the overall system performance.

SUMMARY OF THE INVENTION

An object of this invention is to reduce the latency in data transfer between asynchronous clock domains.

Another object of the present invention is to reduce crossing overhead in data transfer between asynchronous clock domains.

A further object of the invention is to run registers, which are used to transfer data between source and receiving clock domains, at a frequency that is source synchronized with the lower frequency clock of the receiving domain.

These and other objectives are attained with a method of, and an interfacing circuit for, transmitting data between a first clock domain operating at a first clock frequency C1 and a second clock domain operating at a second clock frequency C2. In accordance with this invention, data is transmitted from the first domain, through an interfacing circuitry, and to the second domain. The interfacing circuitry includes a synchronization section that operates at a third frequency C3, wherein C3 is a whole number multiple of C2. For example, C3 may be an even whole number multiple of C2.

In the preferred embodiment, a clock signal A is used to operate the second clock domain at frequency C2, and a clock signal B is used to operate the second section of the interfacing circuitry at frequency C3. Each of the clock signals A and B have regular, active edge portions, and each occurrence of one of the active edge portions of clock signal A is clock aligned with one of the active edge portions of clock signal B. In particular, in this preferred embodiment, clock signals A and B are source synchronized.

Preferably, the synchronization section of the interfacing circuitry includes first and second registers. Clock signal B is applied to both the first and second registers to operate these registers at frequency C3.

For example, in an asynchronous data transfer, the higher clock frequency that launches data may be C1 and the lower clock frequency that captures data may be C2. In accordance with this invention, the interface flip-flops used for double flopping run at a higher source synchronous clock frequency C3. C3 is source synchronized with the low frequency clock C2, and C3 and C2 will always have a common active edge and will be considered synchronous. Since each occurrence of the active edge of the capture clock (the slow clock) will have the active edge of the source synchronous clock aligned with it, there will not be a chance of meta-stability occurring. Clocks are typically classified as source synchronous if they are derived from the same phase locked loop (PLL) and are in phase.

With this preferred embodiment of the invention, the higher the frequency of clock C3, the less the latency becomes. The limitation on the upper limit for a source synchronous clock C3 is the minimum clock period needed to overcome the meta-stability, as stated in the flip-flop specification.

In an embodiment of the invention described below in detail, by using a source synchronous clock running at a higher (say 8X) frequency to double flop the signal at the interface, the latency is reduced to about 8 clock cycles in the receive clock frequency (compared to a latency of 25 clock cycles without using this technique). There is about a 70% improvement in the latency, which enhances the overall system performance. The data transfer rates across the asynchronous interface are tremendously improved.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
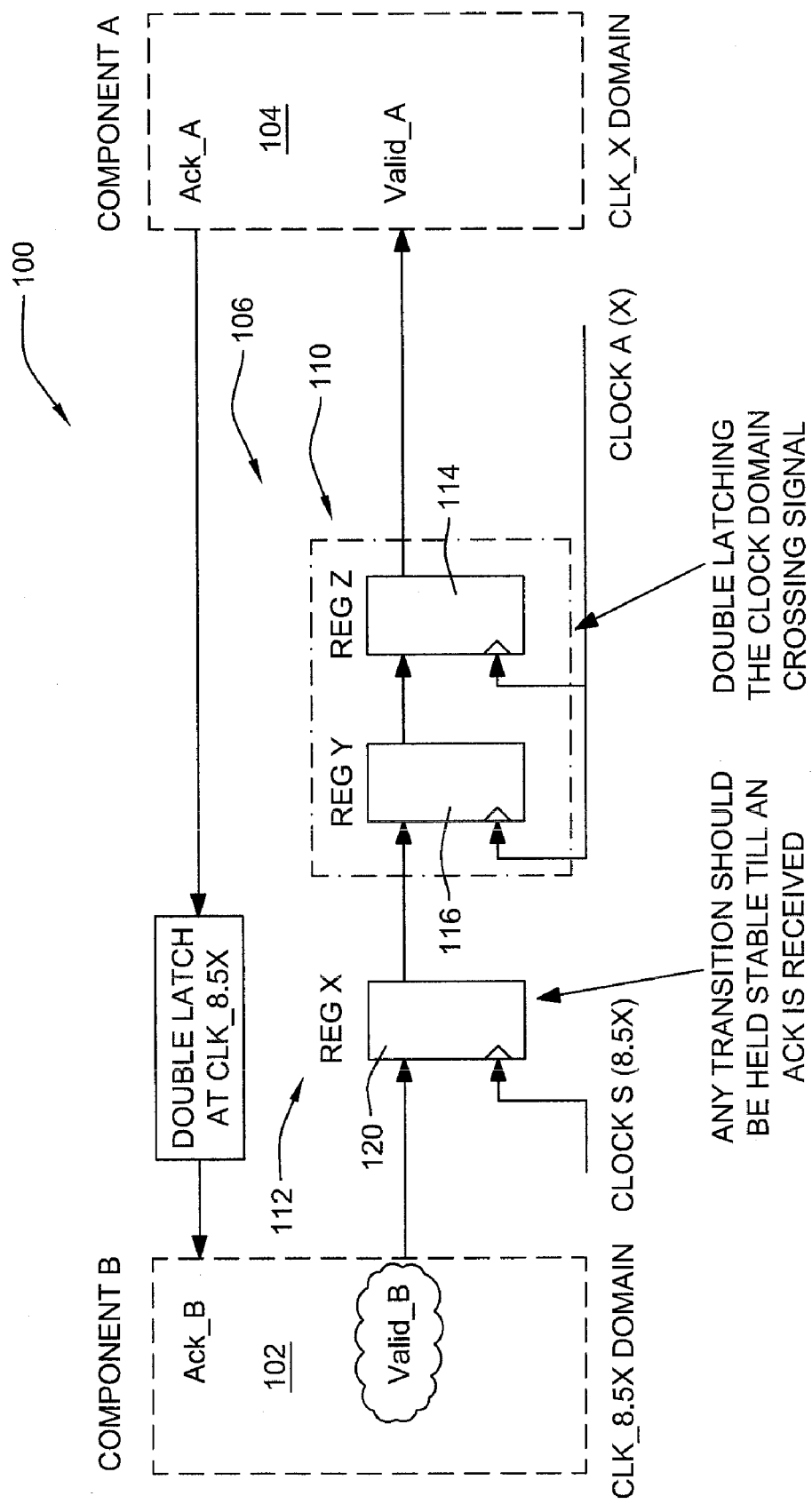
FIG. 1 is a block diagram illustrating two asynchronous clock domains and a prior art procedure for transmitting data between the domains.
Figure 2:
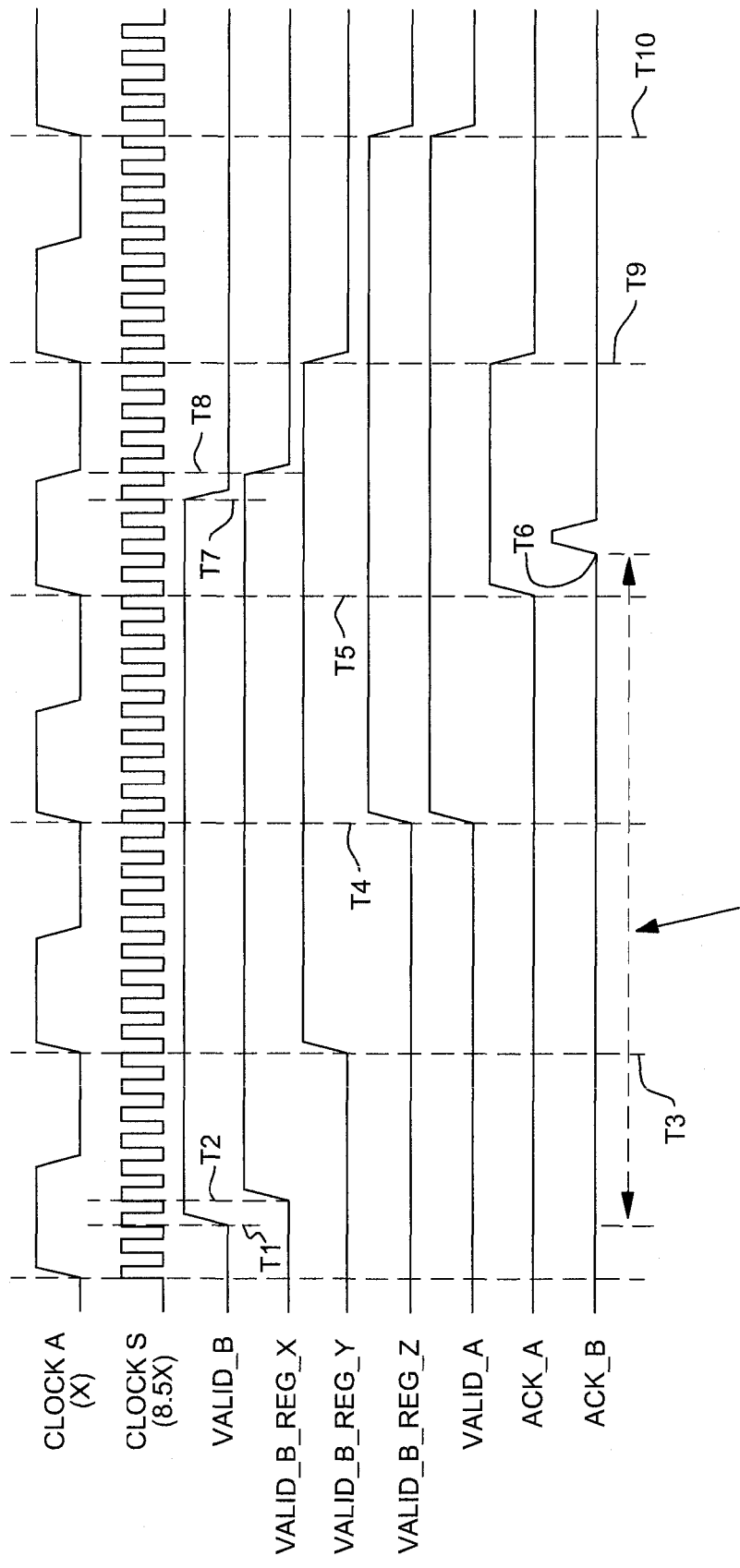
FIG. 2 is a timing diagram showing the timing of signals and data transmitted in the system of FIG. 1.

FIGS. 1 and 2 illustrate a prior art scheme that compensates for asynchronous data transfers between source and destination domains. In particular, system 100 includes source domain 102, destination domain 104, and interface circuitry 106 that connect the source domain to the destination domain.

Interface circuitry, in turn, includes a first section 110 and a second section 112. More specifically, with system 100 shown in FIG. 1, first section 110 includes a first register 114 and a second register 116, and second section 112 includes a third register 120. Destination domain 104 operates at a clock frequency X, and this domain is thus referred to as the CLK X domain. Source domain 102 operates at a clock frequency 8.5 X, and this domain is referred to as the CLK 8.5 X domain.

The destination domain is controlled by a clock signal referred to as Clock A, and the source domain is controlled by a clock signal referred to as Clock S. In the example system 100 of FIG. 1, the source domain may comprise a high speed device configuration register (DCR), whereas the destination domain may comprise a low speed peripheral device such as an interface to a Flash memory.

In the embodiment shown in FIG. 1, section 112 of the interfacing circuitry 106 includes a register 120 for synchronizing the data bit signals (or a control signal that qualifies the data bits) with the source clock frequency (Clock S). The register 120 represents any type of a storage component including a D-Flip-flop or any similar type of edge triggered storage element. The output of register 120 is synchronized to the Clock S.

The Registers 114 and 116 receive the data bit signals (or a control signal that qualifies the data bits) from register 120, and are used for double flopping the clock domain crossing signal(s). The Registers 114 and 116 represent any type of a storage component including a D-Flip-flop or any similar type of edge triggered storage element. In system 100, Registers 114 and 116 operate at a frequency X, FIG. 2 illustrates clock signals A and S and also shows a signal being transmitted through system 100 of FIG. 1. As can be seen, at time T1, the Valid B signal from clock domain 102 goes high; and this signal is latched by Register 120 at the next rising edge of clock S, which occurs at time T2. Valid B from Register 116 then goes high at the next rising edge of clock A, at time T3. Valid B from Register 114 and the Valid A at Component A belonging to the clock domain 104 goes high at the next rising edge of clock A, which occurs at time T4.

The Ack A signal of clock domain 104 goes high at time T5, which occurs at the next rising edge of clock A. This Ack A signal is applied to source domain 102, and is double flopped with the Clock S and appears as Ack B at the component B, at time T6. Valid B then goes low at time T7; and Valid B from Register 120 goes low at the next rising edge of clock S, at time T8. Valid B from Register 116 goes low at the next rising edge of clock A, which occurs at time T9; and Valid B from Register 114 and Valid A at Component A both go low at the next rising edge of clock A, which occurs at time T10.

With the above described procedure, by double latching at the receive clock frequency, there is a latency of about 25 clock cycles in the transmit clock domain, in the example where the clocks frequency ratio is 8.5X and X. The latency could be more or less depending on the ratio of the clock frequencies.

Figure 3:
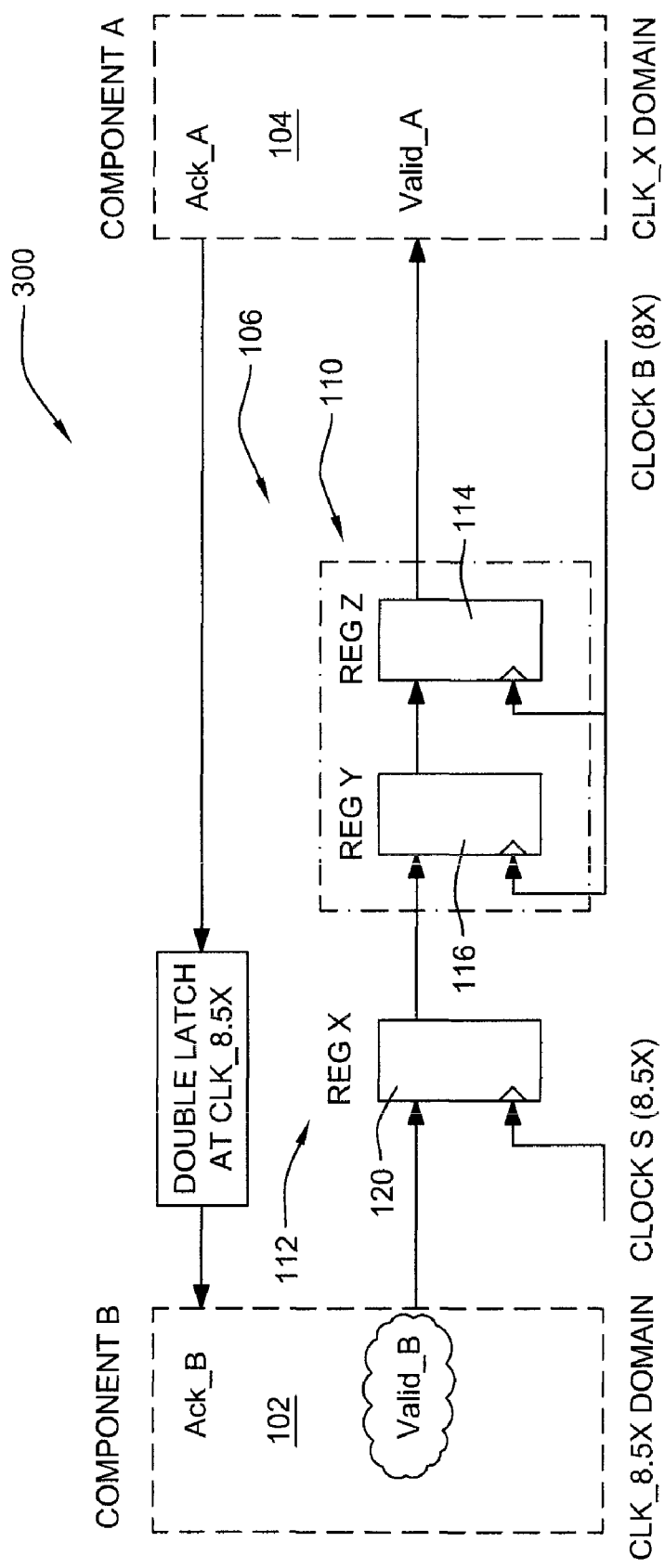
FIG. 3 is a block diagram showing the clock domains of FIG. 1 and a procedure embodying the present invention for transmitting data between the domains.
Figure 4:
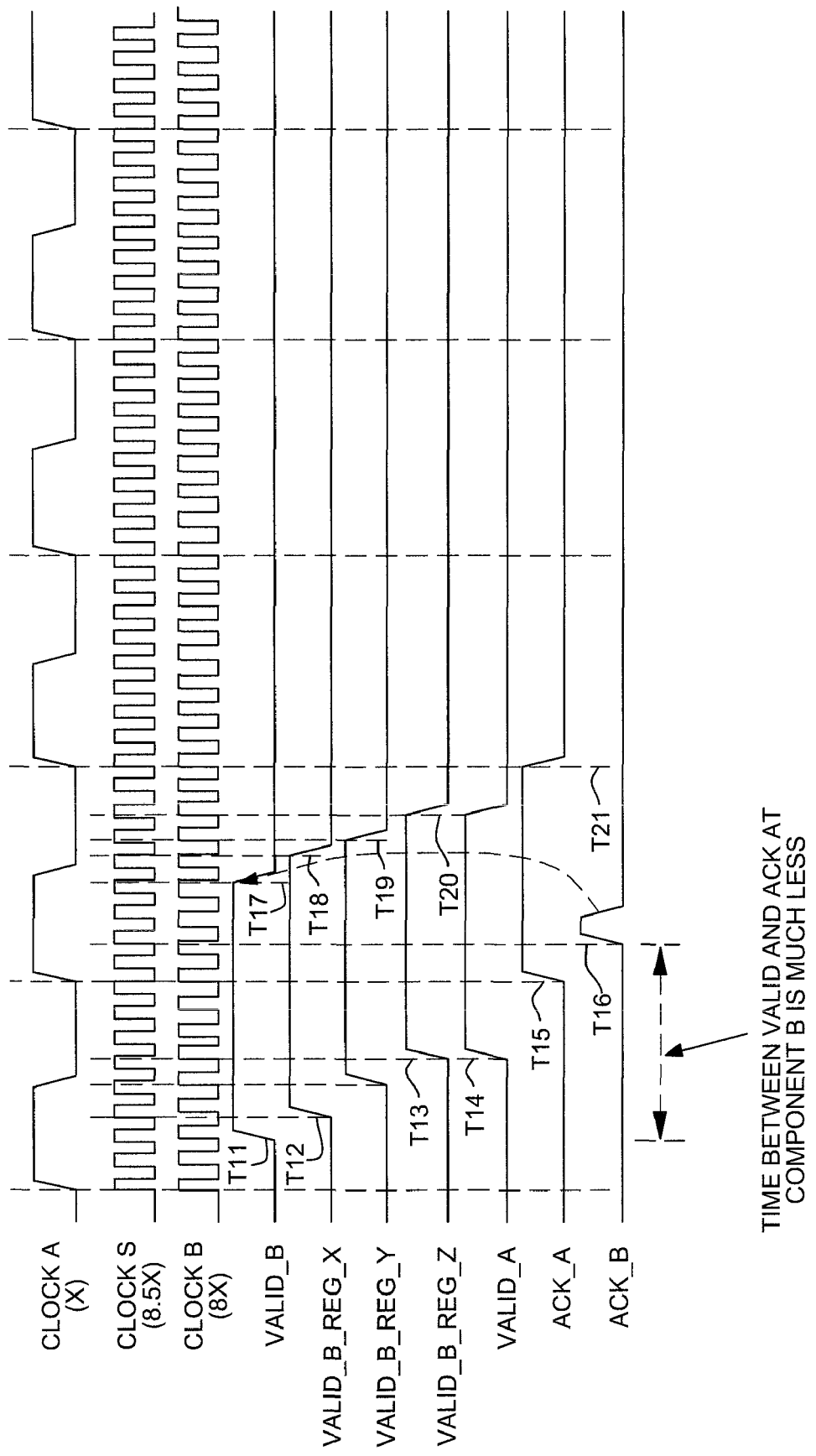
FIG. 4 is a timing diagram showing the timing of signal and data transmitted in the system of FIG. 3 in accordance with the present invention.

FIG. 3 and 4 illustrate the advantages of the present invention.

In particular, FIG. 3 shows a system 300 including the clock domains 102 and 104 and the Registers 114. 116 and 120 of FIG. 1; but as illustrated in FIG. 3, a procedure embodying the present invention is used to transmit data between the clock domains. As illustrated in FIG. 3, Register 120 operates at a clock frequency of 8.5 X; however, Registers 114 and 116 operate at a clock frequency of 8.0 X. This frequency is provided by a clock signal B; and, as discussed in more detail below, clock signal B is preferably source synchronized with clock signal A.

FIG. 4 illustrates clock signals A, B and S and also shows a signal transmitted through system 300 of FIG. 3. As can be seen, at time T11, the Valid B signal of source domain 102 goes high; and this signal is latched by Register 120 at the next rising edge of clock signal S, which occurs at time T12. Valid B from Register 116 then goes high at the next rising edge of clock B, at time T13. Valid B from Register 114 and the Valid A of destination domain 103 then go high at the next rising edge of clock B, which occurs at time T14.

The Ack A signal of destination domain 104 goes high at time T15, which occurs at the next rising edge of clock A. This Ack A signal from clock domain 104 is double flopped with the Clock S and appears as Ack B at the source domain at time T16. Valid B of source domain 102 then goes low at the next rising edge of clock S, at time T17; and Valid B from Register 120 goes low at the next rising edge of clock S, at time T18. Valid B from Register 116 goes low at the next rising edge of clock B, which occurs at time T19; and Valid B from Register 114 and Valid A of destination domain 104 both go low at the next rising edge of clock B, which occurs at time T20. Ack A then goes low at the next rising edge of signal A, at time T21.

By using a source synchronous clock running at a higher (say 8X) frequency to double latch the signal at the interface, the latency is reduced to about 8 clock cycles in the receive clock frequency (compared to a latency of 25 clocks without using this technique). There is about a 70% improvement in the latency; which enhances the overall system performance. The data transfer rates across the asynchronous interface are tremendously improved.

Using a synchronous clock running at a higher frequency to double flop at the asynchronous boundary reduces the double flopping latency to a considerable extent.

Usually, the source synchronous clock will be an even multiple of the receive domain clock (lower freq clock, X), i.e., 2X, 4X, 6X, 8X, etc. The highest possible frequency will be determined by the minimum time needed by the flip-flop to overcome the meta-stability, as specified in the manufactures specification.

It should be noted that, while two D-flip-flops are shown in the preferred embodiment, the invention could be extended to any number (one or more) of flip-flops in the section of the interfacing circuitry operating at the third frequency C3. Also, any edge (rising or falling) can be used as an active edge trigger for any of the synchronizing flip-flops described in the interfacing circuitry. In addition, register 120 may be considered optional in cases where it is known that the asynchronous signal is directly launched off an edge triggered storage element in the Component B.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of transmitting data between a first clock domain operating at a first clock frequency C1 and a second clock domain operating at a second clock frequency C2, the method comprising:

transmitting the data from the first domain, through a synchronization section of an interfacing circuitry, and to the second domain; and operating the synchronization section of the interfacing circuitry at a third frequency C3, wherein C3 is a whole number multiple of C2, wherein C3 is less than C1 and wherein C3 is at least 90% of C1.

2. A method according to claim 1, wherein the step of operating the synchronization section of the interfacing circuitry comprises operating said synchronization section of the interfacing circuitry at the third frequency C3, wherein C3 is an even whole number multiple of C2.

3. A method according to claim 1, wherein a clock signal A is used to operate the second clock domain at frequency C2, and a clock signal B is used to operate a second section of the interfacing circuitry at frequency C3, each of the clock signals A and B have regular, active edge portions, and each occurrence of one of the active edge portions of clock signal A is aligned with one of the active edge portions of clock signal B.

4. A method according to claim 3, wherein clock signals A and B are source synchronized.

5. A method according to claim 4, wherein:
the synchronization section of the interfacing circuitry includes first and second registers; and
the step of operating the synchronization section of the interfacing circuitry at frequency C3 includes the step of operating the first and second registers at frequency C3.

6. A method according to claim 5, wherein the interfacing circuitry includes a third register for receiving signals from the first domain, and the first and second registers are in series between the third register and the second clock domain.

7. A method according to claim 6, wherein the third register operates at frequency C1, and C2 is substantially less than C1.

8. An interfacing circuitry for transmitting data between a first clock domain operating at a first clock frequency C1 and a second clock domain operating at a second clock frequency C2, the interfacing circuitry comprising:
a synchronization section for receiving data transmitted from the first clock domains; and including:
a data storage component for receiving said data and for transmitting the data to the second clock domain, and wherein said data storage component operates at a third frequency C3 that is a whole number multiple of C2, wherein C3 is an even whole number multiple of C2, wherein C3 is less than C1, and wherein C3 is at least 90% of C1.

9. An interfacing circuitry according to claim 8, wherein a clock signal A is applied to the second clock domain to operate said second clock domain at C2, a clock signal B is applied to the data storage component of the interfacing circuitry to operate said data storage component at C3.

10. An interface circuitry according to claim 9, wherein said clock signals A and B are source synchronized.

11. An interfacing circuitry according to claim 8, wherein:
said data storage component includes first and second registers in series between said first clock domain and the second clock domain; and
clock signal B is applied to both the first and second registers to operate the first and second registers at frequency C3.

* * * * *